(12) United States Patent
Takahashi et al.

(10) Patent No.: US 7,114,481 B2
(45) Date of Patent: *Oct. 3, 2006

(54) STABILIZED BEARING STRUCTURE FOR SUPPORTING A CRANKSHAFT IN AN INTERNAL COMBUSTION ENGINE, AND ENGINE INCLUDING SAME

(75) Inventors: Akira Takahashi, Saitama (JP); Teruo Kihara, Saitama (JP); Yoichi Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 10/949,822

(22) Filed: Sep. 24, 2004

(65) Prior Publication Data

US 2005/0109306 A1 May 26, 2005

(30) Foreign Application Priority Data

Sep. 30, 2003 (JP) .............................. 2003-339417

(51) Int. Cl.
*F16C 9/02* (2006.01)
*F02B 67/06* (2006.01)

(52) U.S. Cl. .............................. 123/195 R; 123/192.1; 123/197.4

(58) Field of Classification Search ............ 123/195 R, 123/192.1, 197.4; 384/432, 429, 278, 294
See application file for complete search history.

(56) References Cited

U.S. PATENT DOCUMENTS

| | | | | |
|---|---|---|---|---|
| 3,595,101 | A | * | 7/1971 | Cooper, Sr. .................. 74/596 |
| 4,834,041 | A | * | 5/1989 | Valev ...................... 123/198 E |
| 6,058,894 | A | * | 5/2000 | Kobayashi et al. ...... 123/41.56 |
| 6,530,353 | B1 | * | 3/2003 | Ito et al. .................. 123/195 R |
| 2004/0139942 | A1 | * | 7/2004 | Kamping ................. 123/192.1 |
| 2005/0078895 | A1 | * | 4/2005 | Kanbe et al. ............... 384/432 |

FOREIGN PATENT DOCUMENTS

JP 2003083080 A * 3/2003

* cited by examiner

*Primary Examiner*—Mahmoud Gimie
*Assistant Examiner*—Jason Benton
(74) *Attorney, Agent, or Firm*—Carrier, Blackman & Associates, P.C.; William D. Blackman; Joseph P. Carrier

(57) ABSTRACT

An internal combustion engine includes a split crankcase with spaced-apart journal walls. Each journal wall has a bearing hole formed therein. The engine also includes rotary bearings for supporting rotary movement of a crankshaft. A backlash-absorbing mechanism is situated proximate a first one of the rotary bearings, for cushioning radial movement of an outer bearing race. Axial movement-restraining structure is also provided adjacent the outer race, for limiting axial movement thereof. The axial movement-restraining structure may include an engaging groove provided in an inner circumferential surface of the outer race, and a restraining clamp member operatively attached to a surface of the crankcase. The restraining clamp member may include a hook portion which engages with the engaging groove of the outer race. The axial movement-restraining structure allows at least one of the crankshaft support bearings to be a roller bearing or a needle bearing, instead of a ball bearing.

20 Claims, 8 Drawing Sheets

STABILIZED BEARING STRUCTURE FOR SUPPORTING A CRANKSHAFT IN AN INTERNAL COMBUSTION ENGINE, AND ENGINE INCLUDING SAME

CROSS-REFERENCE TO RELATED APPLICATIONS

The present application claims priority under 35 USC 119 based on Japanese patent application No. 2003-339417, filed Sep. 30, 2003.

BACKGROUND OF THE INVENTION

1. Field of the Invention

The present invention relates to internal combustion engines. More particularly, the present invention relates to a stabilized bearing structure for rotatably supporting a crankshaft in a crankcase of an internal combustion engine, and to an engine incorporating the stabilized bearing structure.

2. Description of the Background Art

Many different types of internal combustion engines are known and commercially

Generally, in a single-cylinder internal combustion engine for a motorcycle or the like, a crankshaft is rotatably supported on a crankcase through a left-right pair of rotary bearings, a piston slidable in a cylinder bore is connected to a crank pin of the crankshaft through a connecting rod. During engine operation, an explosion pressure exerted on the piston is transmitted through the connecting rod to the crankshaft, and from the crankshaft to the crankcase through the rotary bearings.

In this type of engine, it is desirable that the inner and outer races of the bearings are securely attached to their respective engine components. Many of the known prior art bearings, therefore, have been respectively press fitted over journal shaft portions of the crankshaft and inside bearing portions of the crankcase, respectively. As a result, a rattling sound, which might otherwise occur due to backlashes between the fitted components, is suppressed, and a desired bearing function for the crankshaft is maintained, ensuring smooth and light rotation.

With such a known configuration, however, if the races of the rotary bearings are respectively press fitted over the crankshaft and into the crankcase, it then becomes a difficult to mount the crankshaft in the crankcase, and to subsequently perform maintenance thereof.

In order to solve this problem, conventionally, an engine structure and method of assembly has been adopted, in which the outer race of the right bearing is press fitted into a right crankcase half, and the inner race of the left bearing is press fitted over a left-side journal shaft portion of the crankshaft, prior to mounting the crankshaft onto the crankcase. This conventional engine structure is shown in FIG. 9.

At the time of mounting the crankshaft into the crankcase, a right-side journal shaft portion of the crankshaft is press fitted in the inner race of the right bearing (of which the outer race is already press fitted in the right-side crankcase half). Then, the outer race of the left bearing, with the inner race thereof already press fitted over the left-side journal portion of the crankshaft, is play fitted (fitted, with a play) into a left-side crankcase half, thereby facilitating the mounting of the crankshaft onto the crankcase and the maintenance thereof.

However, in this type of conventional structure, some play remains between the left outer bearing race and the left crankcase half after assembly. As a result, during operation of the engine, a little "backlash" is unavoidably generated between the outer race of the left bearing and a bearing surface of the crankcase. Therefore, a rattling sound due to the "backlash" is generated upon the operation of the internal combustion engine, and the desired bearing function cannot be optimized. structure in which the outside surface of the outer race of either one (preferably, the left-side one) of a pair of ball bearings is pushed in the axial direction by a push plug having an inclined push surface, so as to absorb the "backlash". In the structure disclosed in this reference, however, the pushing force exerted on the outer race by the push plug is divided into a component force in the radial direction (for absorbing the "backlash") and a component force in the axial direction, with the result that the component force in the axial direction acts as a force for moving the outer race in the axial direction.

Meanwhile, in the structure disclosed in Japanese Laid-Open Patent No. 2003-83080, the ball bearing (in which a resistance force for receiving the force in the axial direction is present) is adopted for each of the rotary bearings, for the crankshaft. The component force in the axial direction generated by the pushing force from the push plug can be satisfactorily received by the ball bearing (the right-side ball bearing) on the side of not being pushed by the push plug, and shifting of the bearing, due to the component force in the axial direction, can be avoided.

However, the ball bearing is bulkier in the radial direction than a roller bearing or a needle bearing, in comparison for the same rated capacity, leading to a larger occupying space of the crankshaft in the radial direction and, hence, to an increase in the overall size and weight of the internal combustion engine. Therefore, there is a need for an improved crankshaft support bearing system using at least one bearing other than the ball bearing, as at least one of the bearings for rotatably supporting the crankshaft.

SUMMARY OF THE INVENTION

The present invention has been made in consideration of the above-mentioned circumstances. Accordingly, it is an object of the present invention to provide a stabilized bearing structure for supporting a crankshaft in an internal combustion engine, where the engine includes a rotary bearing and a backlash-absorbing mechanism for absorbing a backlash of a bearing race in the radial direction.

It is another object of the present invention to provide a stabilized bearing structure for supporting a crankshaft in an internal combustion engine, wherein a bearing other than a ball bearing can be used as at least one of the rotary bearings for rotatably supporting the crankshaft.

In order to attain the above objects, a crankshaft support structure according to a first embodiment of the present invention provides a stabilized bearing structure for a crankshaft in an internal combustion engine including a crankcase and a crankshaft rotatably supported on the crankcase through rotary bearings. The engine includes a backlash-absorbing mechanism, provided between the outer race of one of the rotary bearings and the crankcase, for absorbing radial backlash between an outer race of the bearing and the crankcase.

The stabilized bearing structure according to the first embodiment hereof is characterized in that an axial movement-restraining structure is provided between the outer race and the crankcase, for restraining axial movement of the outer race of the selected rotary bearing.

The presence of the axial movement-restraining structure allows at least one of the crankshaft support bearings to be a roller bearing or a needle bearing, instead of a ball bearing.

In a crankshaft-supporting structure according to a second embodiment of the invention, a plurality of movement-restraining structures are disposed at intervals around the circumference of the outer race.

Further, in a crankshaft-supporting structure according to a third embodiment of the invention, in addition to the characteristics of the first embodiment, the movement-restraining structure includes an engaging groove provided in an inner circumferential surface of the outer race, and a retaining clamp member provided outside of the crankcase. In this third embodiment, the retaining clamp member includes a hook portion, which engages with the engaging groove.

According to the first embodiment hereof, the radial backlash generated between the outer race of the rotary bearing and the bearing hole therefore is absorbed by the backlash-absorbing mechanism. Using the structure according to the first embodiment, rattling sounds due to backlash, which could otherwise be generated, can be effectively suppressed, and a desired bearing function can be maintained.

In addition, when using the crankshaft-supporting structure according to the first embodiment hereof, axial movement of the outer race of the rotary bearing, which necessarily arises from the presence of the backlash-absorbing mechanism, can be restrained by the movement-restraining structure.

The presence of the movement-restraining structure allows an engine designer to use a roller bearing, a needle bearing or a similar bearing, which is less expensive, lighter in weight and more compact than the ball bearing, as the rotary bearing for supporting the crankshaft.

In addition, according to the second characteristic of the invention as set forth in the second embodiment hereof, in addition to the first characteristic, axial displacement of the rotary bearing can be substantially prevented by the movement-restraining structures.

Furthermore, according to the third characteristic of the invention as set forth in the third embodiment hereof, in addition to the first or second characteristic, the movement-restraining structure can be easily mounted from the outside of the crankcase half, and it is unnecessary to provide the crankcase with a cutout or relief for mounting a moving means onto a bearing surface, so that the strength of the crankcase is maintained.

For a more complete understanding of the present invention, the render is referred to the following detailed description section, which should be read in conjunction with the accompanying drawings. Throughout the following detailed description and in the drawings, like numbers refer to like parts.

DETAILED DESCRIPTION

Now, a number of selected illustrative embodiments for carrying out the present invention will be described specifically below, and illustrated in the accompanying drawings.

It should be understood that only structures considered necessary for clarifying the present invention are described herein. Other conventional structures, and those of ancillary and auxiliary components of the system, are assumed to be known and understood by those skilled in the art.

Figure 1:
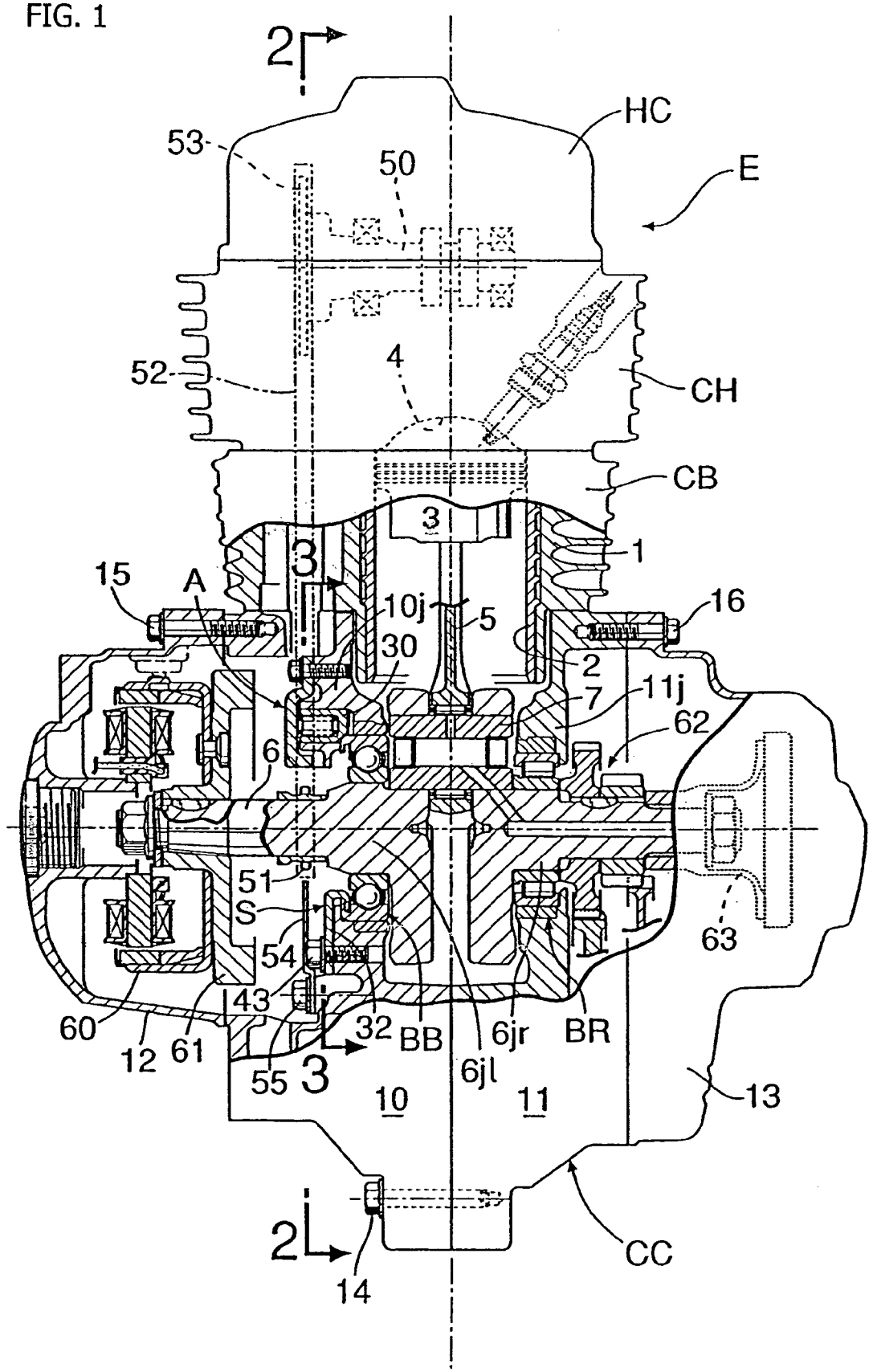
FIG. 1 is a side plan view, partially in cross-section, of an internal combustion engine including a stabilized bearing structure for supporting a crankshaft according to a selected illustrative embodiment of the present invention.
Figure 2:
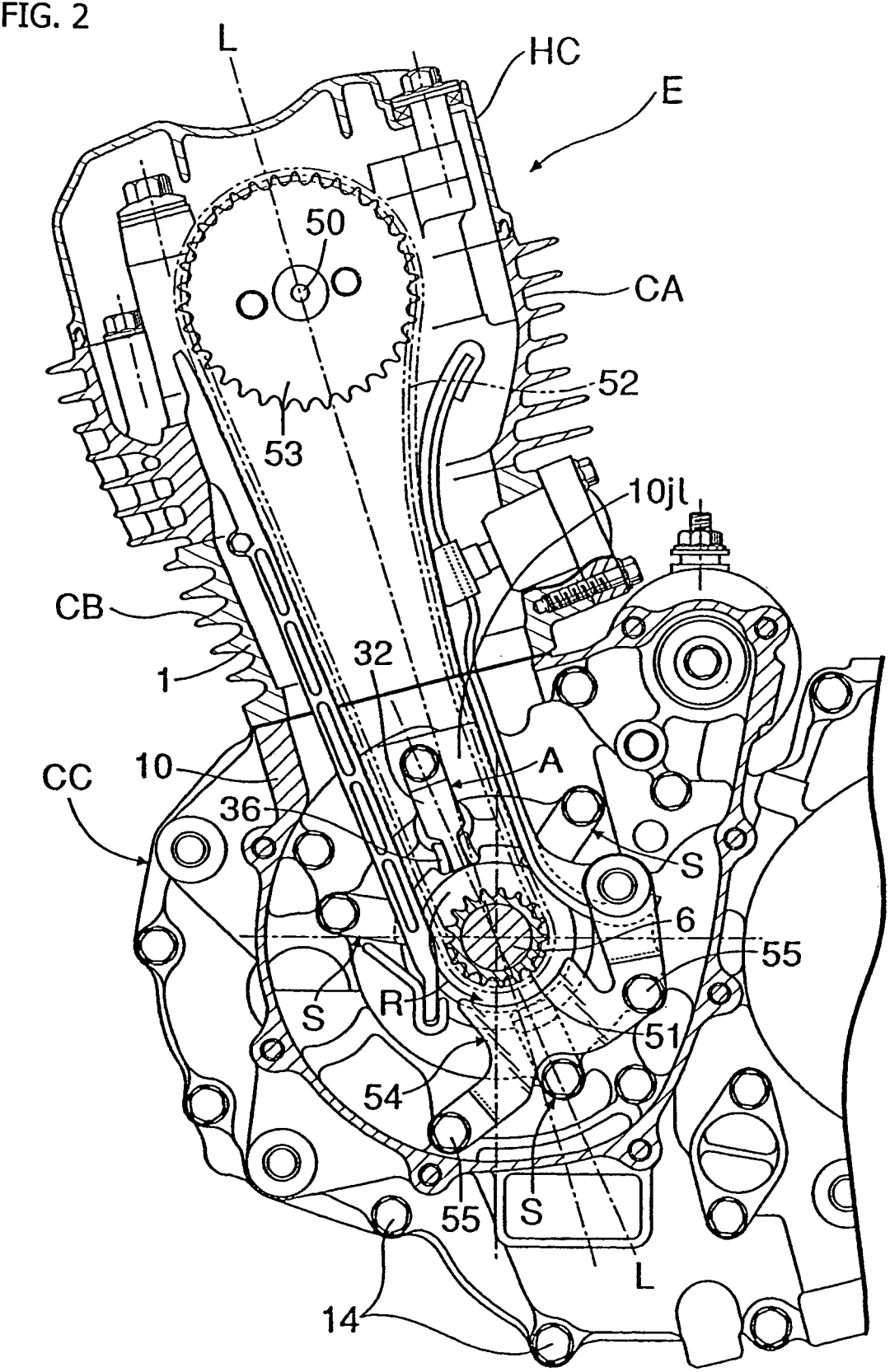
FIG. 2 is a sectional view of the engine of FIG. 1, taken along line 2—2 of FIG. 1.
Figure 3:
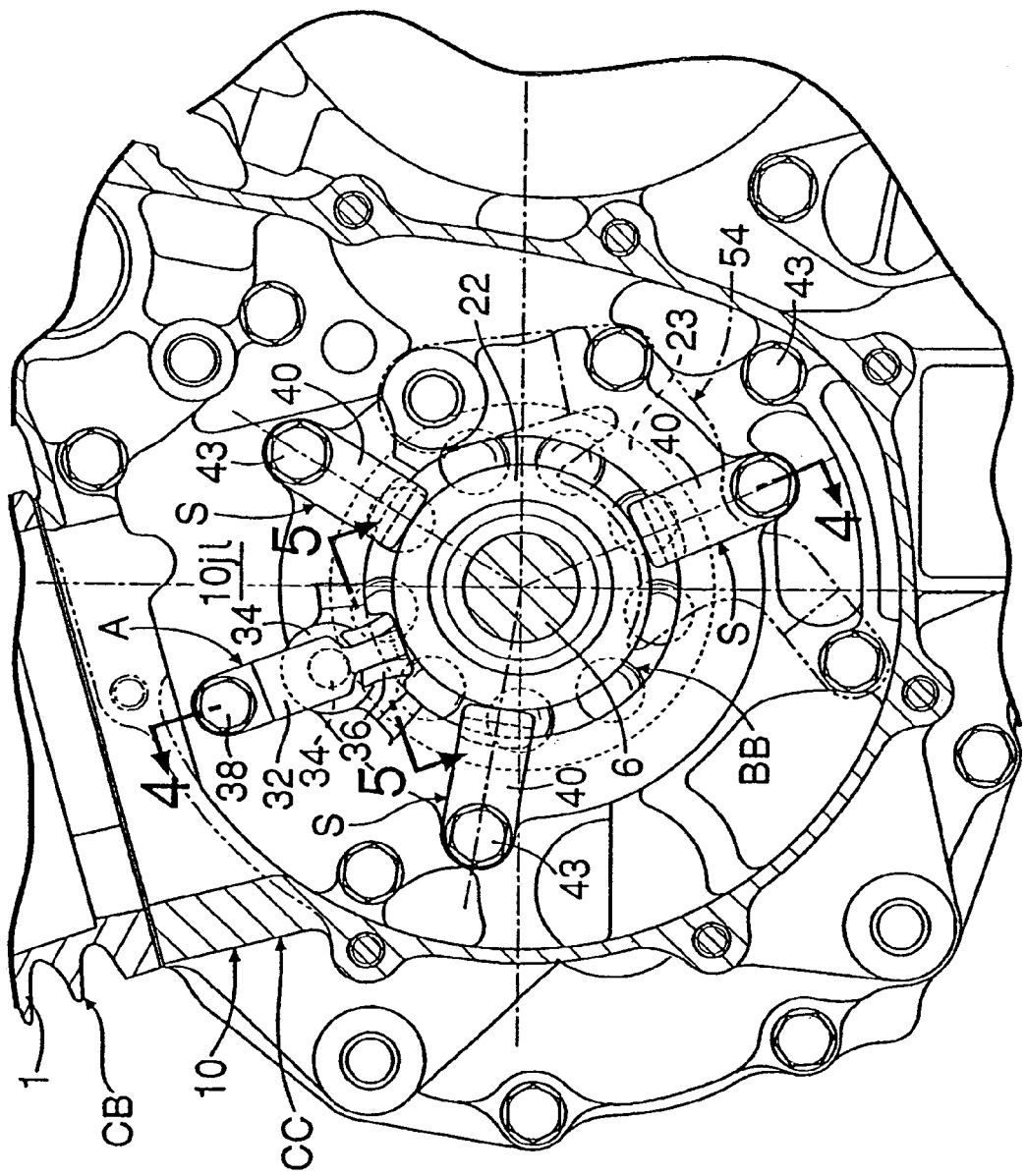
FIG. 3 is an enlarged sectional detail view of the engine of FIG. 1, taken along line 3—3 of FIG. 1.

In the drawings, FIG. 1 is a side plan view, partially in cross-section, of an internal combustion engine including a stabilized bearing structure for supporting a crankshaft according to a selected illustrative embodiment of the present invention. FIG. 2 is a sectional view of the engine of FIG. 1, taken along line 2—2 of FIG. 1. FIG. 3 is an enlarged sectional detail view of the engine of FIG. 1, taken along line 3—3 of FIG. 1.

As shown in FIGS. 1 and 2, an OHC type four-cycle single-cylinder internal combustion engine E includes a cylinder block CB, a cylinder head CH fixed onto a deck surface of the cylinder block CB, and a left-right split crankcase CC fixed to a lower portion of the cylinder head CH. The engine E also includes a head cover HC attached to an upper surface of the cylinder head CH.

A piston 3 is slidably and reciprocally fitted in a cylinder 1 provided in a central portion of the cylinder block CB and having a cylinder sleeve 2, and a combustion chamber 4 is formed in the cylinder head CH oppositely to the surface of the piston 3. A small end portion of a connecting rod 5 is rotatably connected to a piston pin of the piston 3, and a large end portion of the connecting rod 5 is rotatably connected to a crank pin 7 of the crankshaft 6.

A crankshaft 6 is rotatably supported on the crankcase CC through left and right rotary bearings BB, BR, which will be described later.

The crankcase CC includes a left-side crankcase half 10 and a right-side crankcase half 11, which are each cast from a metal, such as iron or a light aluminum-based alloy. The left-side and right-side crankcase halves, 10, 11 are fixedly connected to each other by a plurality of bolts 14.

A left-side cover 12 is attached to the outside surface of an opening of the left-side crankcase half 10 and fixed in place by a bolt 15. Similarly, a right-side cover 13 is attached to the outside surface of an opening of the right-side crankcase half 11 and fixed in place by a bolt 16.

The left-side and right-side crankcase halves 10 and 11 are respectively provided with integrally formed left and right journal walls 10j and 11j, which are opposed to each other with an interval therebetween. The left and right journal walls 10j and 11j are respectively provided with aligned left and right bearing holes 18 and 19 formed therein and opened on the same axis. In the depicted embodiment, the left bearing holes 18 is larger in diameter than the right bearing hole 19, so that different types of bearings can be accommodated herein.

Each of the left and right journal walls 10j and 11j, respectively, is provided with a bearing-engaging surface, respectively surrounding the left and right bearings holes 18, 19. Optionally, each of the bearing-engaging surfaces may be formed as part of a machined cast-iron ring 20, 21 (FIG. 4) which is cast in place in the respective journal wall at the time of casting the crankcase. The cast-iron rings 20, 21 defining the bearing-engaging surfaces may be pre-made, and the journal walls may be made therearound to surround and enclose the rings, where the crankcase halves 10, 11 are made from an aluminum alloy.

Left and right journal shaft portions 6jl, 6jr of the crankshaft 6 are rotatably borne inside of the left and right bearing holes 18, 19 through the left-side and right-side rotary bearings BB, BR.

Figure 4:
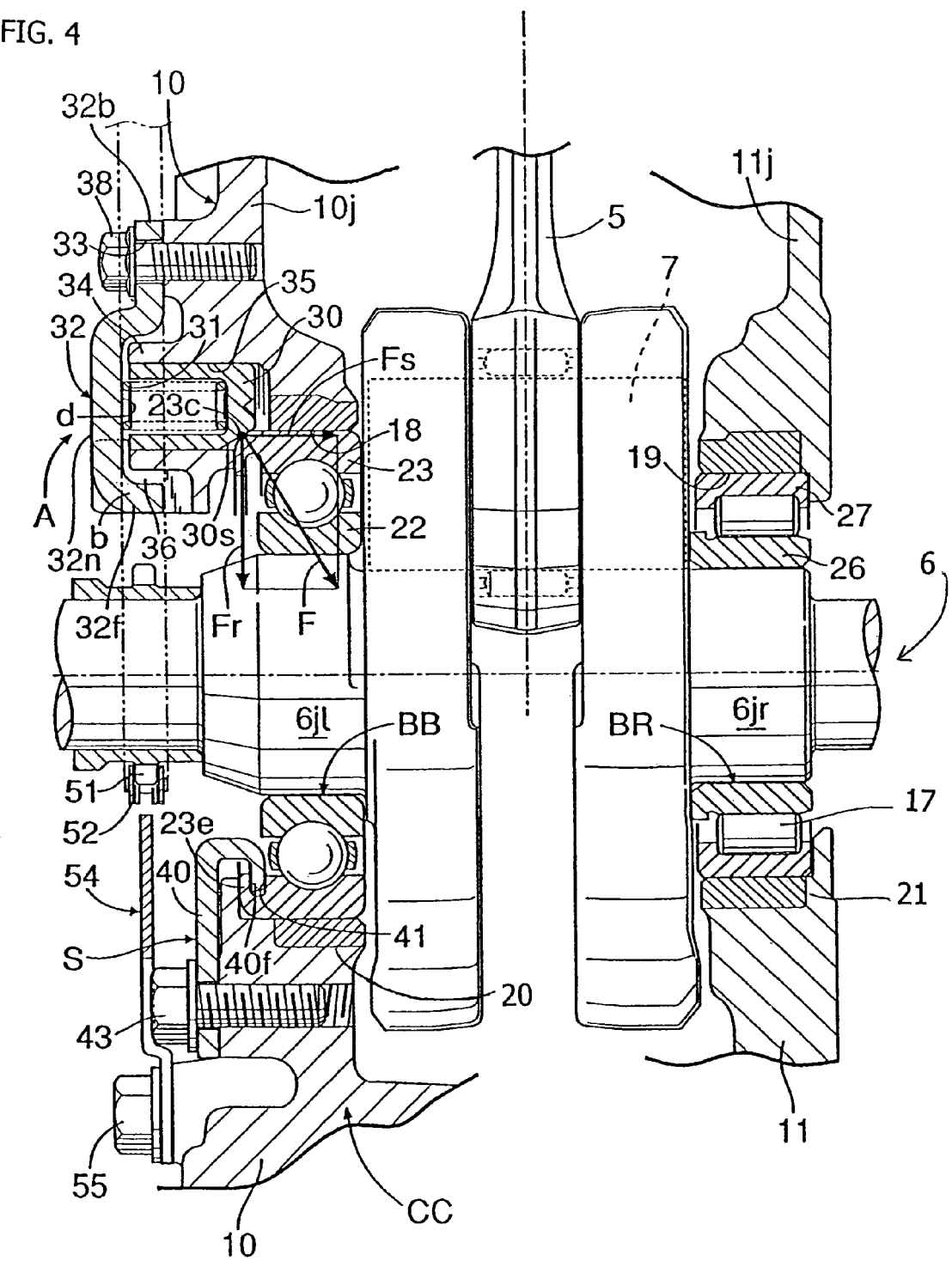
FIG. 4 is a sectional view of the engine of FIG. 1, taken along line 4—4 of FIG. 3.

As clearly shown in FIG. 4, in the depicted embodiment, the left-side rotary bearing BB is a ball bearing, whereas the right-side rotary bearing BR is a roller bearing, in which the rollers 17 are substantially cylindrical, as shown. An inner race 22 of the left-side rotary bearing, or ball bearing, BB is press fitted over the left journal shaft portion 6jl of the crankshaft 6, and an outer race 23 thereof is play fitted (with some backlash in the radial direction) in the bearing hole 18 in the left journal wall 10j.

The outer bearing race 23 is extended outwardly beyond the inner race 22 in the axial direction (away from the cylinder axis), to form an extended portion 23e. The inner circumferential surface of the extended portion 23e is provided with an engaging groove 41 formed in an inwardly-facing surface thereof, which constitutes part of a movement restraining structure S. As it will be understood, the extended portion 23c of outer race 23 is an engagement portion which extends outwardly beyond the corresponding inner race 22 and the engagement portion of the outer race 23 is engaged by the axial movement restraining structure.

A retaining clamp member 40 is bolted to the crankcase 10 by a bolt 55, and is substantially J-shaped as viewed from the side. The retaining clamp member 40 includes a generally rounded first end 42 in the depicted embodiment, and a second end 44 opposite the first end portion 42 has a medial hole 45 formed therethrough, for use in attaching the retaining clamp member 40 to the crankcase 6.

The second end 44 of the retaining clamp member 40 includes a hook portion 40f which is configured to be disengageably inserted in the engaging groove 41 of the outer bearing race 23. As shown in FIG. 4, a gap is provided between the engaging grove 41 and the hook portion 40f, to permit the outer race 23 to move slightly in the axial direction relative to the hook portion 40f. When bolted to the crankcase 10 with the hook portion 40f engaged in the groove 41, the retaining clamp member 40 effectively restrains axial movement of the outer race 23.

In addition, an inner race 26 of the right-side rotary bearing, or roller bearing, BR is fitted over the right journal shaft portion 6jr of the crankshaft 6, and an outer race 27 of the roller bearing BR is press fitted in the bearing-engaging surface surrounding the bearing hole 19 of the right journal wall 11j.

After the inner race 26 is fitted over the right journal shaft portion 6jr of the crankshaft 6, the position of the inner race 26 on the right journal shaft portion 6jr of the crankshaft 6 is fixed by co-fastening it by a nut from a shaft end of the crankshaft 6 together with a gear group 62 and a centrifugal filter 63 (see FIG. 1).

Backlash-Absorbing Mechanism

As shown in FIGS. 1 and 3, between the crankshaft 6 and the cylinder 1, a backlash-absorbing mechanism A for absorbing the "backlash" in the radial direction between the outer bearing race 23 and the bearing hole 18 is provided on the left journal wall 10j of the left-side crankcase half 10 at a position close to the outside of an upper portion of the ball bearing BB and along the axial direction of the crankshaft 6.

Figure 6:
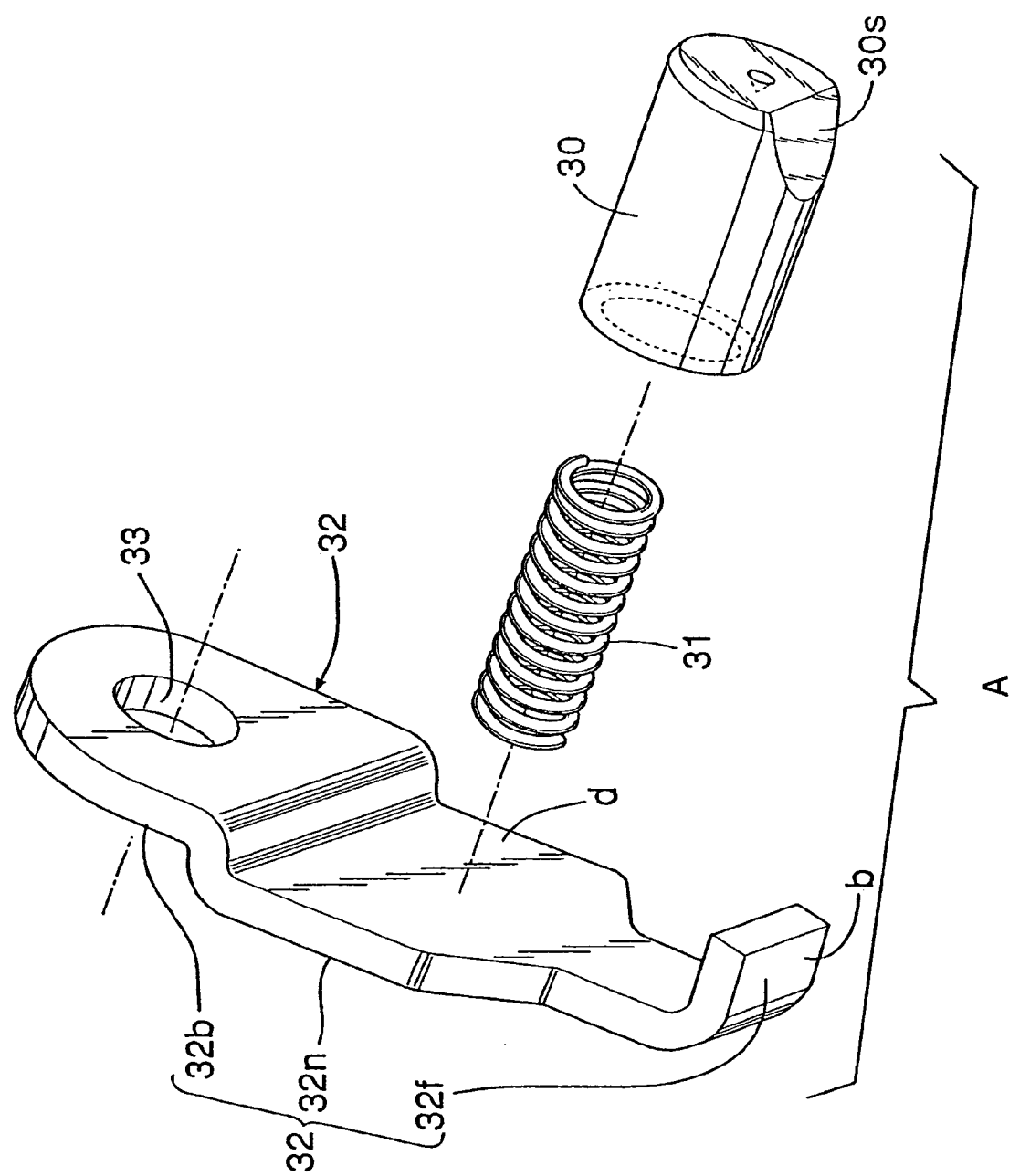
FIG. 6 is an exploded perspective view of a push plug subassembly.

As shown in FIGS. 3, 4 and 6, the backlash-absorbing mechanism A includes a push plug 30, a coil spring 31, and a spring set plate 32.

The push plug 30 is formed in a hollow, flat-bottomed cylindrical shape, and is provided with a slant surface 30s at a corner portion of the bottom side end wall thereof. The push plug 30 is slidably fitted in a cylindrical hole 35 which is formed in a boss portion 34 of the crankcase 10, located near an upper corner of the ball bearing BB of the left journal wall 10j. The cylindrical hole 35 has an axis extending substantially parallel to the axis of the crankshaft 6 (the direction orthogonal to the cylinder axis).

As shown in FIG. 4, a corner portion 23c arcuate in section of the outer bearing race 23 projects into the cylindrical hole 35, and the slant surface 30s of the push plug 30 abuts on the corner portion 23c.

The coil spring 31 is contained in a central chamber formed in the push plug 30, and the outer end thereof protrudes outside the opening end surface of the push plug 30.

The spring set plate 32 is formed to be slender and elongate in the radial direction of the crankshaft 6, and includes a base portion 32b provided with a bolt hole 33, an intermediate portion 32n provided with a recessed spring-receiving portion of in the inside surface thereof, and a free end portion 32f, having a bent portion b bent inwardly.

The base portion 32b is bolted to the outside surface of the left-side crankcase half 10 by a mount bolt 38, as shown in FIG. 4.

The recessed spring-receiving portion d of the intermediate portion 32n contacts and receives the outer end of the coil spring 31.

Figure 5:
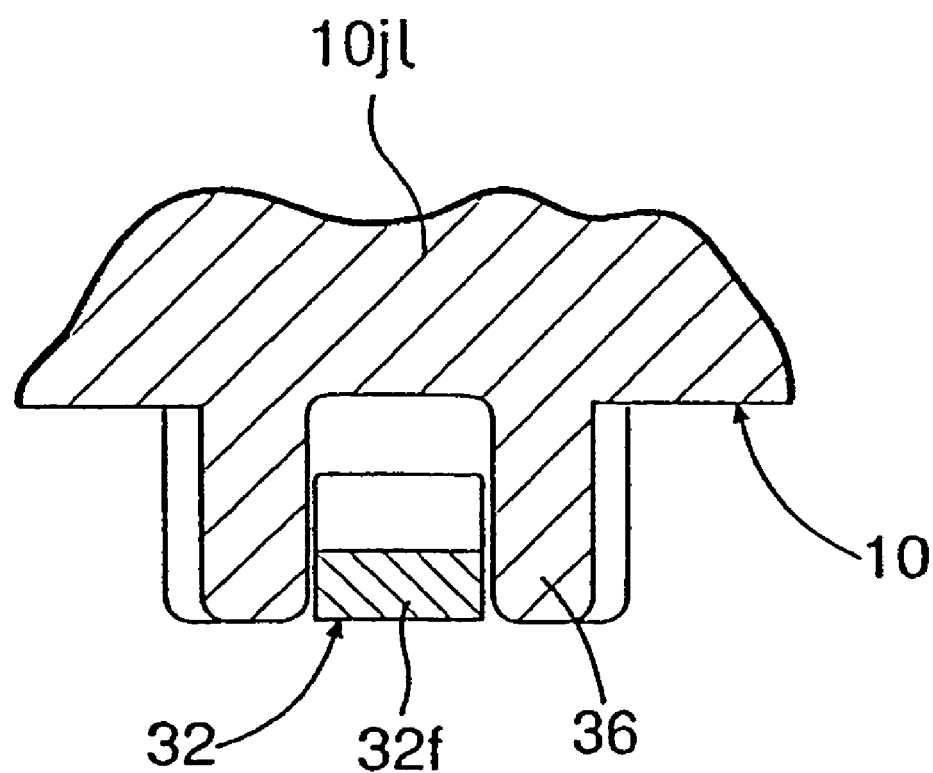
FIG. 5 is an enlarged sectional view of the engine of FIG. 1, taken along line 5—5 of FIG. 3.

The free end portion 32f, having the bent portion b, is formed to be narrower than the intermediate portion 32n. The free end portion 32f of the spring set plate engages with a positioning portion 36 formed as one body with the left-side crankcase half (FIGS. 3, 5).

The positioning portion 36 has a substantially wedge-shaped outline in side view (see FIG. 2) and is also fork-shaped in section (see FIG. 5), whereby the spring set plate 32 is effectively fixed in place and prevented from rotating.

Figure 8:
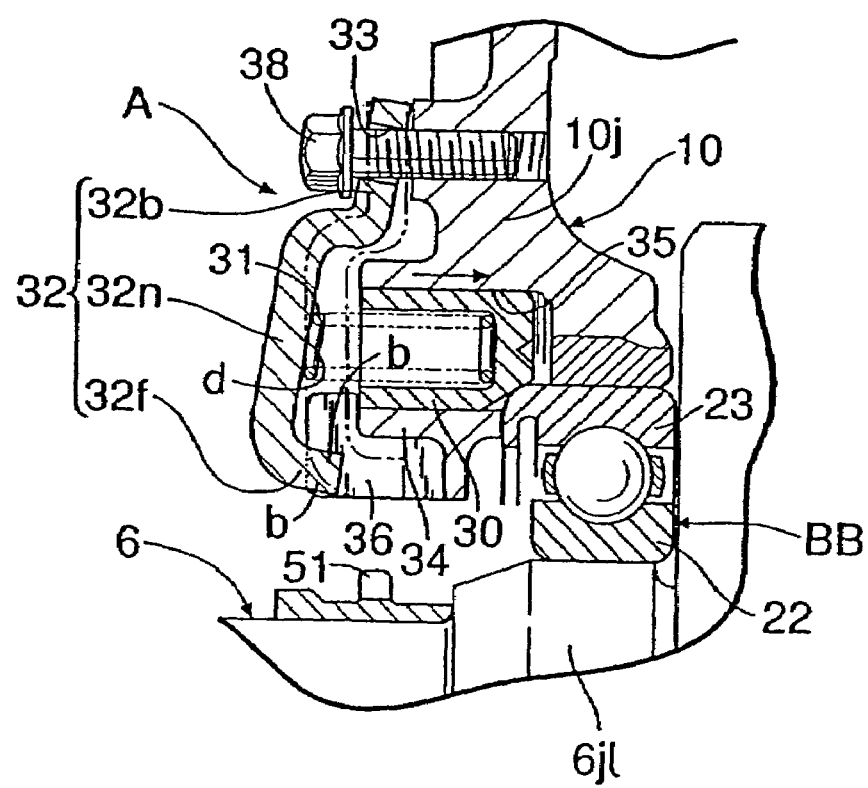
FIG. 8 is a functional diagram showing the condition at the time of mounting a backlash-absorbing mechanism.
Figure 9:
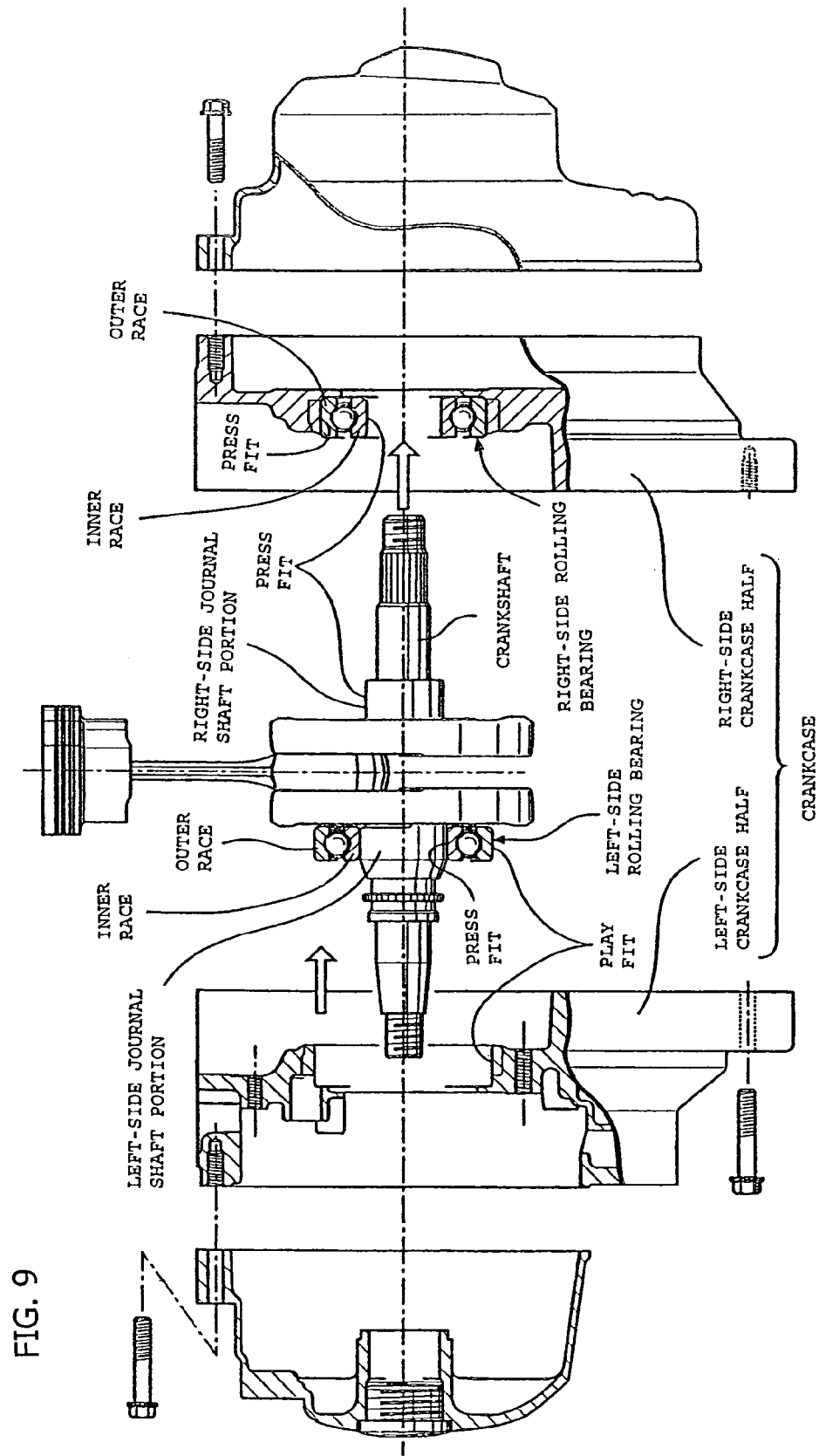
FIG. 9 is a diagram illustrating a prior art process of mounting a crankshaft onto a crankcase.

In mounting the backlash-absorbing mechanism A onto the left-side crankcase half 10, as shown in FIG. 8, the spring set plate 32 is loosely tentiatively fixed to the left-side crankcase half 10 by the mount bolt 38. An end portion of the coil spring 31, having a free length, is received by the recessed spring-receiving portion d of the intermediate portion 32n.

In this condition, the bent portion b of the free end portion 32f of the spring set plate 32 is engaged with the fort-shaped positioning portion 36 of the left-side journal wall 10j, whereby the spring set plate 32 can be positioned in an anti-rotation state.

Therefore, an assembly worker can mount the backlash-absorbing mechanism A without need for tricky or troublesome operations, such as compressing the coil spring 31 or holding the spring set plate 32 with a hand to prevent the spring set plate 32 from rotating. When the mount bolt 38 is tightened to specification, the mounting of the backlash-absorbing mechanism A is completed, as indicated by chain lines in FIG. 4.

In this assembled condition, the boss portion 34 of the left-side crankcase half 10 and the recessed portion d in the intermediate portion 32n of the spring set plate 32 can be fitted to each other, and they can thereby be nearly arranged on the outside surface of the crankcase half 10, with no excess portion projecting from the outside surface of the crankcase half 10.

As has been above-mentioned, the mounting of the backlash-absorbing mechanism A can be conducted from the outside of the left-side crankcase half 10, the mountability is extremely good.

As shown in FIG. 4, in the assembled state of the backlash-absorbing mechanism A, the spring set plate 32 pushes the push plug 30 inwards through the coil spring 31, and the slant surface 30s of the push plug 30 pushes the outer bearing race 23 with an oblique downward pushing force F.

The vertical component force Fr of the pushing force F, namely, the component force Fr in the radial direction of the crankshaft 6 pushes the outer race 23 in the radial direction, and, by this pushing force, the "backlash" in the radial direction between the outer circumferential surface of the outer race 23 and the bearing hole 18 can be effectively suppressed.

Therefore, in the presence of loads in the radial direction on the crankshaft 6 due to an explosion force exerted on the piston 3 or the like, the crankshaft 6 can be appropriately supported without any backlash, and rattling sounds can be substantially suppressed.

The acting direction of the pushing force exerted on the ball bearing BB by the backlash-absorbing mechanism A is set to substantially coincide with the acting direction of the maximum pressure (explosion pressure) exerted on the piston 3.

Specifically, in this internal combustion engine, the position of the piston at the time of receiving the maximum explosion pressure is a little delayed behind the top dead center of the piston. In view of this, as shown in FIG. 2, the backlash-absorbing mechanism A is provided in the direction along the cylinder axis L—L at a position which is slightly deviated in the rotating direction of the crankshaft 6 (in the direction of arrow R in FIG. 2, or counterlockwise) from the cylinder axis L—L, as viewed from the direction of the axis of the crankshaft 6.

This above-described arrangement of components ensures that the direction of the pushing force exerted on the ball bearing BB by the backlash-absorbing mechanism A can be set to coincide substantially with the direction of the maximum pressure exerted on the crankshaft 6 from the piston 3, and the crankshaft 6 is appropriate supported by the ball bearing BB.

Axial Movement-Restraining Structure

Meanwhile, as shown in FIG. 4, the pushing force F exerted on the outer race 23 by the push plug 30 of the backlash-absorbing mechanism A also includes a component force Fs in the horizontal direction, i.e., in the axial direction of the crankshaft 6. Due to this component force Fs, a thrust force in the axial direction is necessarily applied to the outer race 23, and the thrust force acts as a force for axially moving the outer bearing race 23.

In this embodiment, a movement-restraining structure S (which will be described below) is provided, whereby it is possible to receive the thrust force and still effectively restrain the outer race 23 from moving in the axial direction.

Next, the movement-restraining structure S according to the depicted embodiment of the present invention will be described. The movement-restraining structure S includes a plurality of (in this embodiment, three) retaining clamp members 40, and an engaging groove 41, which is formed in the inner circumferential surface of the outer bearing race 23. The hook portions 40f of the retaining clamp members 40 are loosely engaged in the engaging groove 41 of the outer bearing race 23.

Figure 7:
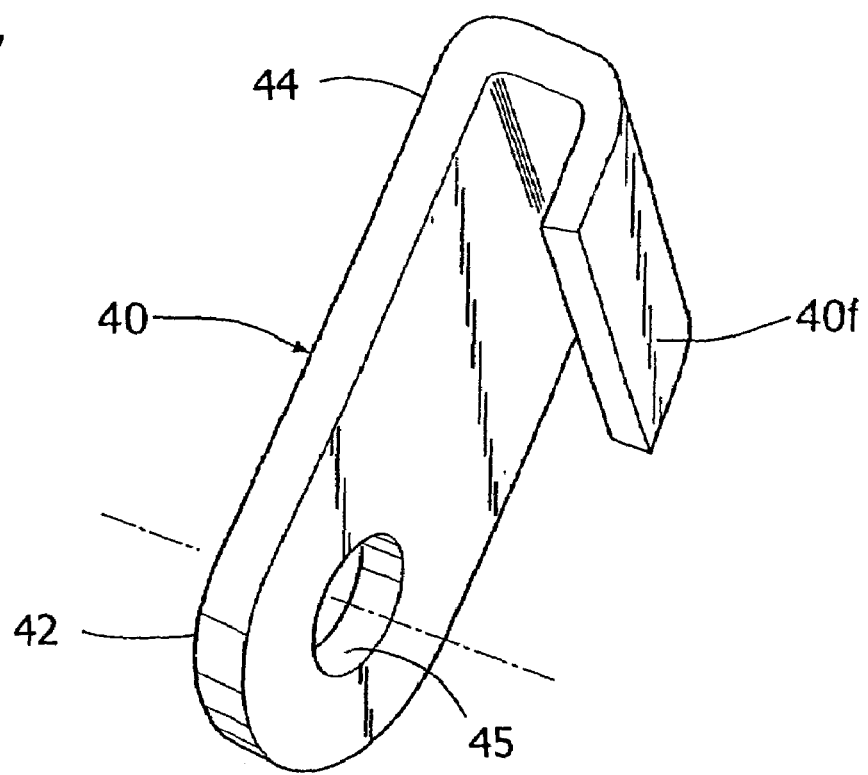
FIG. 7 is a perspective view of a retaining claim member.

As shown in FIG. 7, the retaining clamp member 40 is formed in the shape of a slender elongate plate, which is integrally provided with the hook portion 40f at its tip end. The retaining clamp member 40 is substantially J-shaped as viewed from the side.

As shown in FIGS. 2 and 3, the three retaining clamp members 40 are radially disposed on the outside of the left-side crankcase half 10 at roughly equal intervals around the circumference of the outer bearing race 23. The other ends of the three retaining clamp members 40 are fixed to the outside surface of the left-side crankcase half by the mount bolts 43, at positions on a circle outside of and concentric with the ball bearing BB. The three retaining clamp members 40 are directed toward the center of the ball bearing BB.

The hook portions 40f at the inner ends of the three retaining clamp members 40 are bent toward the inside surface of the outer race of the ball bearing BB, and are engaged with the engaging groove 41 inside the outer race. A slight gap is provided between each of the hook portions 40f and the engaging groove 41, in the axial direction thereof.

The engagement between the hook portions 40f and the engaging groove 41 effectively restrain the outer bearing race 23 from moving in the axial direction. As a result, it is unnecessary to provide a second ball bearing to support the right side of the crankcase, to receive the above-mentioned thrust force (as in the previously known structures).

Instead, a roller bearing BR with a smaller diameter (as compared with the ball bearing BB) can be adopted as the right-side rotary bearing, as in this embodiment.

Besides, as shown in FIGS. 2 and 3, when the three retaining clamp members 40 are provided at least at three positions at intervals of approximately 120° along the circumferential direction, the loads in the axial direction can be equally received, and the ball bearing BB can be substantially prevented from axial displacement thereof.

Since the movement-restraining structure S includes the retaining clamp members 40 fixed to the outside surface of the left-side crankcase half 10, and the engaging groove 41 formed in the inner circumferential surface of the outer bearing race 23, the movement-retaining structure S is simple in structure. Therefore, at the time of mounting the movement-restraining structure S onto the left-side crankcase half 10, it is unnecessary to provide the left-side crankcase half 10 with a mounting shape such as a cutout, and the strength of the left-side crankcase half 10 can be maintained.

Besides, since the movement-restraining structure S can be mounted from the outside of the left-side crankcase half 10, the mounting is easy to carry out, and the mounting does not need any special equipment or jig.

As shown in FIGS. 1 and 2, a drive sprocket 51 for timed driving of a valve-operating camshaft 50 is fixed on the outside of the ball bearing BB of the crankshaft 6, and the drive sprocket 51 is operated in conjunction with a driven sprocket 53 fixed to the valve-operating camshaft 50 rotatably shaft-supported on the cylinder head CH, through an endless chain 52.

The rotation of the crankshaft 6 is transmitted through the drive sprocket 51, the endless chain 52 and the driven sprocket 53 to the valve-operating camshaft 50. On the lower side of the crankcase 6, a chain drop preventive plate 54 for preventing the chain 52 from dropping off is fixed to the left-side crankcase half 10 by a plurality of bolts 55.

As shown in FIG. 2, the chain drop preventive plate 54 has an arcuate portion opposed closely to an arcuate lower surface of the chain 52 wound around the drive sprocket 51, and the chain 52 can be prevented from dropping off by the arcuate portion.

As seen in FIGS. 1 and 2, a flywheel 61 with an outer rotor 60 of an ACG fixed thereon is fixed to a left side end portion of the crankshaft 6, and a gear group 62 operated in conjunction with a transmission, a balancer and the like and a centrifugal oil filter 63 are fixed to a right side end portion of the crankshaft 6.

Next, the functions of this embodiment will be described.

When the internal combustion engine E is operated, the crankshaft 6 borne on the crankcase CC through the ball bearing BB and the roller bearing BR is driven to rotate, while the "backlash" in the radial direction generated between the outer bearing race 23 and the bearing hole 18 in the left-side crankcase half 10 can be absorbed by the backlash-absorbing mechanism A. Accordingly, rattling sounds due to the "backlash" can be significantly suppressed, and the crankshaft 6 can be approximately supported by the bearings BB and BR, thereby securing smooth and light rotation of the crankshaft 6.

In addition, axial movement of the outer bearing race 23, which could arise from the force exerted thereon the backlash-absorbing mechanism A in some of the previously known engines, can now be restrained by the movement-restraining structure S. Accordingly, one of the pair of rotary bearings for supporting the crankshaft 6, can now be chosen to be a roller bearing (smaller in diameter and higher in rigidity than a ball bearing), and the internal combustion engine E can thereby be made compact.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

For example, a first needle bearing or roller bearing may be used in place of the ball bearing on the left side, and/or another needle bearing may be used in place of the roller bearing on the right side.

The invention claimed is:

1. In an internal combustion engine comprising a crankcase, a crankshaft rotatably supported on the crankcase through a plurality of rotary bearings, and a backlash-absorbing mechanism provided between an outer race of one of said rotary bearings and said crankcase;
the improvement comprising a stabilized bearing structure for supporting said crankshaft, wherein said stabilized bearing structure comprises an axial movement restraining structure adjacent said outer race for limiting axial movement of said outer race relative to said crankcase;
wherein the outer race comprises an engagement portion which extends outwardly beyond a corresponding inner race and the engagement portion of the outer race is engaged by the axial movement restraining structure.

2. The stabilized bearing structure of claim 1, wherein said axial movement restraining structure comprises at least one restraining clamp member provided between said outer race and said crankcase for restraining axial movement of said outer race.

3. The stabilized bearing structure of claim 2, wherein said stabilized bearing structure comprises a plurality of said restraining clamp members disposed around the circumference of said outer race.

4. An internal combustion engine comprising:
a crankcase;
a crankshaft rotatably supported on the crankcase through a plurality of rotary bearings;
a backlash-absorbing mechanism provided between an outer race of said rotary bearings and said crankcase; and
a stabilized bearing structure for supporting said crankshaft;
wherein said stabilized bearing structure comprises an axial movement restraining structure adjacent said outer race for limiting axial movement of said outer race relative to said crankcase;
wherein said axial movement restraining structure comprises an engaging groove provided in an inner circumferential surface of said outer race; and a restraining clamp member operatively attached to a surface of said crankcase, wherein the restraining clamp member comprises a hook portion which engages with said engaging groove.

5. The stabilized bearing structure of claim 4, wherein said restraining clamp member has a first end situated opposite said hook portion and said first end includes a medial hole formed therethrough.

6. The stabilized bearing structure of claim 1, wherein said backlash-absorbing mechanism comprises:
a boss formed in said crankcase with a cylindrical bore formed therein to slidably receive a push plug;
a push plug having a modified cylindrical shape with a hollow chamber formed therein; said push plug disposed within said cylindrical bore of said boss;
a slanted surface at a corner portion of a bottom side end wall of the push plug for contacting said outer race;
a coil spring which fits into the hollow chamber of said push plug; and
a spring set plate attached to said crankcase to retain said coil spring and said push plug within the cylindrical bore of said boss.

7. The stabilized bearing structure of claim 1, wherein the crankcase comprises a left journal wall and a right journal wall spaced apart from the left journal wall, each of said journal walls having a bearing hole formed therein for receiving the rotary bearing, wherein each of the journal walls comprises a bearing-engaging surface surrounding the bearing hole, each of said bearing-engaging surfaces comprising a cast-iron ring which is cast into the journal wall.

8. The stabilized bearing structure of claim 7, wherein the rotary bearings includes at least one of a roller bearing, a needle bearing and a ball bearing.

9. The stabilized bearing structure of claim 3, wherein said restraining clamp members are disposed at substantially equal intervals around the circumference of said outer race.

10. An internal combustion engine, comprising:
a crankcase having a left half section and a right half section, each said half section having a respective journal wall, each of said journal walls having a bearing hole formed therein;
a cylinder block fixedly connected to said crankcase;

a piston reciprocally mounted in said cylinder block and operatively connected to said crankshaft;

a rotary bearing journaled into each of said bearing holes of the respective journal walls;

a crankshaft rotatably supported in the crankcase by said rotary bearings;

a backlash-absorbing mechanism situated proximate a first of said rotary bearings and operatively attached to said crankcase for cushioning radial movement of an outer race of said first rotary bearing; and an axial movement restraining structure adjacent said outer race for limiting axial movement of said outer race relatively to said crankcase;

wherein the outer race comprises an engagement portion which extends outwardly beyond a corresponding inner race and the engagement portion of the outer race is engaged by the axial movement restraining structure.

11. The engine of claim 10, wherein said axial movement restraining structure comprises at least one restraining clamp member provided between said outer race and said crankcase for restraining axial movement of said outer race.

12. The engine of claim 11, wherein said stabilized bearing structures comprises a plurality of said restraining clamp members disposed around the circumference of said outer race.

13. An internal combustion engine comprising:

a crankcase having a left half section and a right half section, each said half section having a respective journal wall, each of said journal walls having a bearing hole formed therein;

a cylinder block fixedly connected to said crankcase;

a piston reciprocally mounted in said cylinder block and operatively connected to said crankshaft;

a rotary bearing journaled into each of said bearing holes of the respective journal walls;

a crankshaft rotatably supported in the crankshaft by said rotary bearings;

a backlash-absorbing mechanism situated proximate a first of said rotary bearings and operatively attached to said crankcase for cushioning radial movement of an outer race of said first rotary bearing; and an axial movement restraining structure adjacent said outer race for limiting axial movement of said outer race relative to said crankcase;

wherein said axial movement restraining structure comprises an engaging groove provided in an inner circumferential surface of said outer race; and a restraining clamp member operatively attached to a surface of said crankcase, wherein the restraining clamp member comprises a hook portion which engages with said engaging groove.

14. The engine of claim 13, wherein said restraining clamp member has a first end situated opposite said hook portion and said first end has a medial hole formed therethrough.

15. The engine of claim 10, wherein said backlash-absorbing mechanism comprises:

a boss formed in said crankcase with a cylindrical bore formed therein to slidably receive a push plug;

a push plug having a modified cylindrical shape with a hollow chamber formed therein; said push plug disposed within said cylindrical bore of said boos;

a slanted surface at a corner portion of a bottom side end wall of the push plug for contacting said outer race;

a coil spring which fits into the hollow chamber of said push plug; and a spring set plate attached to said crankcase to retain said coil spring and said push plug within the cylindrical bore of said boss.

16. The engine of claim 10, wherein each of the journal walls comprises a bearing-engaging surface surrounding the bearing hole, each of said bearing-engaging surfaces comprising a cast-iron ring which is cast into the journal wall.

17. The engine of claim 10, wherein the rotary bearings includes at least one of a roller bearing, needle bearing and a ball bearing.

18. The engine of claim 11, wherein the restraining clamp member is substantially J-shaped.

19. The engine of claim 12, wherein said restraining clamp members are disposed at substantially equal intervals around the circumference of said outer race.

20. The internal combustion engine of claim 13, wherein the outer race comprises an engagement portion which extends beyond a corresponding inner race.

* * * * *